Inventor
Edward M. Jones
By
Graf, Nierman & Burmeister
Attorneys

Inventor
Edward M. Jones

Graf, Nierman & Burmeister
Attorneys 3,043,962

OPTICAL ENCODER

Edward M. Jones, Cincinnati, Ohio, assignor to The Baldwin Piano Company, Cincinnati, Ohio, a corporation of Ohio Filed Aug. 18, 1959, Ser. No. 834,604
24 Claims. (Cl. 250—220)

The present invention relates to devices for improving the response time of photocell circuits, and more particularly to optical analog-to-digital encoders.

An optical encoder generally employs a code member mounted for movement responsive to the analog information to be encoded, the code member generally being in the form of a disc with a plurality of coaxial tracks containing opaque and transparent sectors. A light source is positioned on one side of the code member, and a plurality of photocells are positioned confronting a radius of the code disc on the other side of the code disc confronting the light source. Optical encoders are provided with an interrogating or sampling means for determining the presence or absence of a transparent sector confronting each individual photocell at a particular time, and in this manner, the angular position of the disc is converted to digital form.

Up to the present time, interrogating of the code member has been accomplished by one of two methods. The first method is to periodically flash the light source, so that the response of the photocells during the flash indicates the presence or absence of a transparent sector confronting each individual photocell at the particular moment of the light flash. Flashing light encoders are capable of high accuracy and speeds up to 100 revolutions per minute of the code disc for 13 digit discs. Unfortunately, flashing light sources which have been available have not been thoroughly satisfactory in view of the short life of the light source and the requirement of high potentials to achieve the short duration light pulse.

The other method which has been employed for interrogating the code member of an optical encoder is to employ photoconductive photocells and pulse the photoconductive cells at the desired time to produce a pulse which indicates the presence or absence of a transparent sector confronting the photocells. This method of interrogating a code member permits use of a constant intensity light source and may be employed with 13 digit code discs having maximum rotational rates up to approximately 2 revolutions per minute. The relatively low rotation rate of the code disc is a limitation to the use of pulsed photocells for interrogation of an optical encoder.

It is one of the objects of the present invention to provide an optical encoder with a constant intensity light source which has a code member which may be moved at higher rates than has heretofore been feasible.

It is a further object of the present invention to provide a photocell circuit with an improved light to dark and dark to light response time.

It is a further object of the present invention to provide an optical encoder with a plurality of photocells continuously responsive to a constant intensity light source which utilizes alternating current amplification techniques.

These and further objects of the present invention will be more readily apparent from a further reading of this disclosure, particularly when viewed in the light of the drawings, in which.

Figure 1:
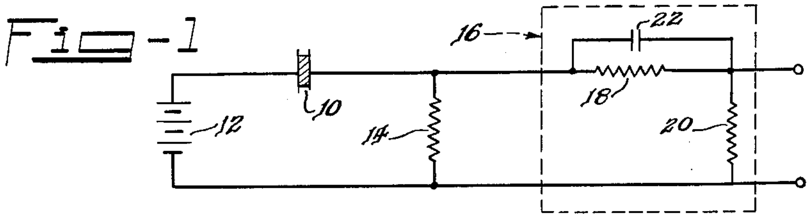
FIGURE 1 is a schematic electrical circuit diagram of a photocell circuit embodying the teachings of the present invention.

FIGURE 1 schematically illustrates a photocell 10 conconnected in a series circuit which compensates for the response time of the cell. The photocell employs a mass of photoconductive material or photovoltaic material disposed between a pair of electrodes, and may be constructed in the manner disclosed in the patent application of Hugle and Hugle entitled "Photocells and Method of Manufacturing Photocells," Serial No. 574,804, filed March 29, 1956, now Patent No. 2,994,621 or in any of the manners presently known in the art, and may employ any of the photoconductive materials known to the art. Suitable photoconductive materials are cadmium selenide, cadmium sulfide, lead sulfide, lead selenide, zinc selenide, zinc sulfide, zinc telluride, cadmium telluride, germanium, silicon, and lead telluride. Silicon junction photocells are examples of photovoltaic cells.

The cell 10 which in the particular construction is a photoconductive cell, is connected in a series circuit with a direct current power source, illustrated as a battery 12, and a resistor 14. This portion of the photocell circuit is identical to that illustrated in the patent application of the inventor entitled "Optical Encoder," Serial No. 655,653, filed April 29, 1957. A time constant compensation circuit 16 is connected in cascade with the resistor 14 and consists of resistors 18 and 20 connected in series across the resistor 14 and a capacitor 22 connected in parallel with the resistor 18.

The time constant compensating circuit combines the derivative of the pulse produced by the application of a square wave light pulse to the pulse itself to approximate the square wave light pulse. The instantaneous rise voltage, $E_r$, appearing across the resistor 14 may thus be expressed as $E_r = RI(1-e^{-t/T})$, where R is the value of resistor 14. The instantaneous decay voltage $E_d$, appearing across resistor 14 is $E_d = RIe^{-t/T}$.

With the time constant compensation circuit, the current generated by the photocell circuit is divided so that a portion of this current flows through the resistor 14 and the remainder flows through the circuit 16. If resistor 20 is selected to have the same value as resistor 14, and resistor 18 is selected to have a value eighteen times that of resistor 14, then one-twentieth of the photocell current will flow through the compensation circuit 16. Under these conditions, the potential developed across resistor 20 will most nearly approximate the shape of the light pulse applied to the photocell 10 when the capacitor 22 has a capacity equal to the time constant of the photocell divided by the resistance of the resistor 18.

A typical time constant for a cadmium selenide photocell is 300 microseconds. The shaft of a thirteen digit encoder rotated at six revolutions per minute advances approximately ¼ quanta during 300 microseconds, and thus the sharpness of the transition between sectors of the code disc may be impaired, and hence the accuracy of the encoder may be reduced as a result of the response time of the photocell in the absence of a time constant compensation circuit.

With one-twentieth of the photocell current flowing through the time constant compensation circuit as indicated above, the rise voltage appearing across resistor 20 is as follows, $$E_r = \frac{IR}{20}(1-e^{-10t/T})$$

and the decay potential across resistor 20 is given by the following expression.

$$E_d=\frac{IR}{20}e^{-10t/T}$$

It is thus clear that the transition in the signals developed across resistor 20 is only 30 microseconds, and under these conditions the encoder is capable of operation at sixty revolutions per minute, rather than six as before, without impairing the accuracy of the encoder. Of course, the magnitude of the signal obtained across resistor 20 is only approximately one-twentieth of that appearing across resistor 14. The smaller the percentage of photocell current flowing through the time constant compensation circuit, the greater the improvement in the time constant of the signal, but the lower the output of the circuit.

Figures 2, 4:
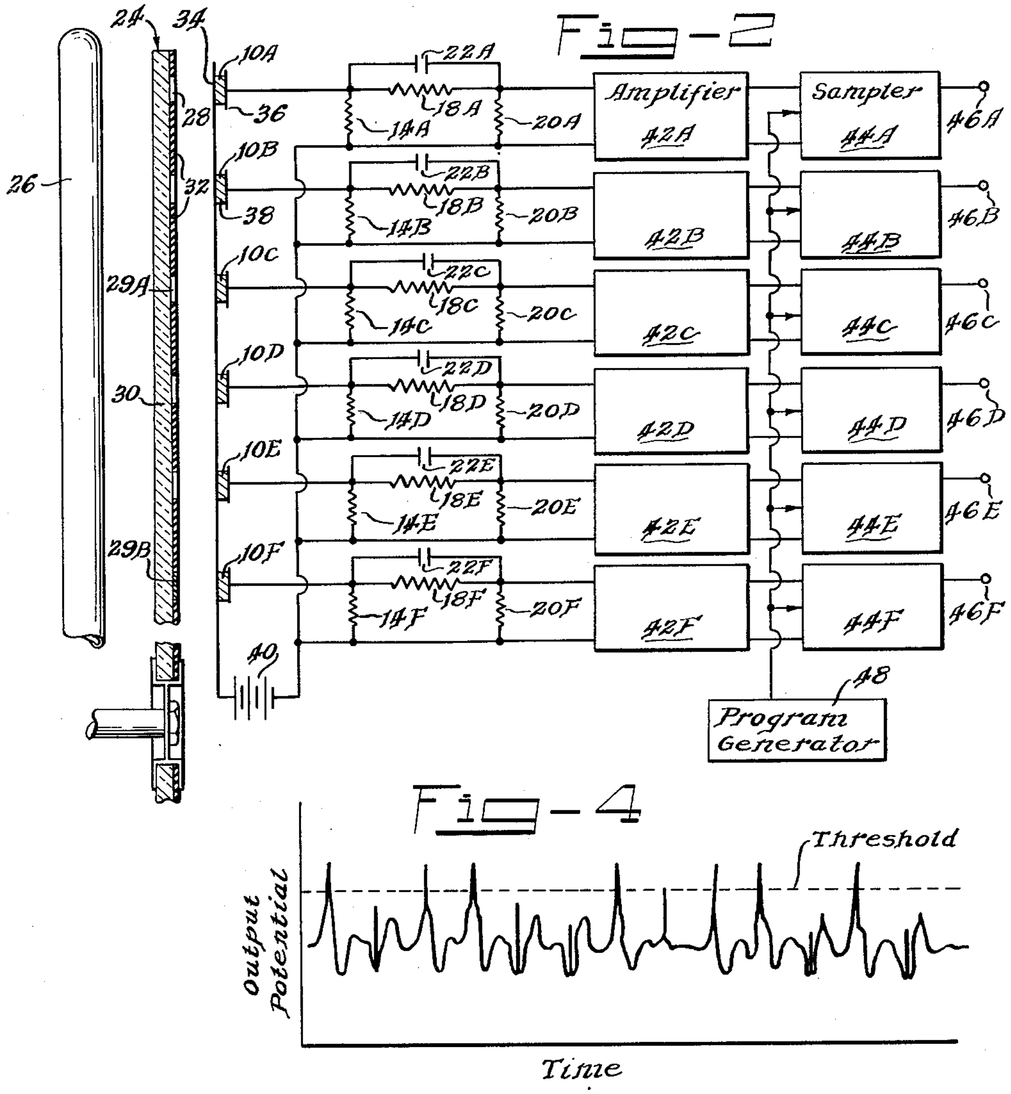
FIGURE 2 is a schematic electrical circuit diagram of an optical encoder utilizing the photocell circuit illustrated in FIGURE 1.
FIGURE 4 is a graph illustrating the output potential of the encoder of FIGURE 3 as a function of time.

Conventional methods of periodically determining the angular position of the code disc of an encoder either flash the light source or apply a pulse to the photocells, as stated above. At present, it is not possible to employ either of these methods with a time constant compensation means for the photocells. FIGURE 2 indicates one embodiment of the invention in which an optical encoder employs time constant compensation for the photocells of the encoder.

In FIG. 2, six photocells 10A, 10B, 10C, 10D, 10E and 10F are shown confronting the side of a code disc 24 opposite a light source 26. It is to be understood that in practice an encoder would employ in most cases more than six photocells, since a photocell is employed for each digit of the encoder, but that six have been illustrated for clarity. The code disc 24 has a track 28 of transparent sectors 29B and opaque sectors 29A coaxially disposed about the center of the disc and confronting each of the photocells. The code disc 24 is illustrated as having a transparent plate 30, such as glass, supporting an opaque layer 32, such as a developed photographic emulsion, which contains the coaxial tracks 28.

The photocells 10A, 10B, 10C, 10E, and 10F have one common electrode 34, and each of the photocells has a second electrode 36 spaced therefrom, although it is to be understood that the photocells may be completely independent of each other. A mass 38 of semiconductor material, as set forth above, is disposed between the electrode 34 and each of the electrodes 36 to form the photocells. One terminal of a direct current power source, such as a battery 40, is connected to the electrode 34, and the other terminal of the power source is connected to the electrode 36 of each photocell through separate resistors 14A, 14B, 14C, 14D, 14E, and 14F. Resistors 18A and 20A are connected in series and in parallel with resistor 14A, and a capacitor 22A is connected in parallel with resistor 18A. Resistors 18B and 20B are connected in series and in parallel with the resistor 14B, and a capacitor 22B is connected in parallel with resistor 18B. Resistors 18C and 20C are connected in series and in parallel with the resistor 14C, and a capacitor 22C is connected in parallel with resistor 18C. In like manner, resistors 18D and 20D, 18E and 20E and 18F and 20F are connected in series and in parallel with the resistors 14D, 14E and 14F, respectively, and capacitors 22D, 22E and 22F are connected in parallel with the resistors 18D, 18E and 18F, respectively.

A direct current amplifier 42A is connected in parallel with resistor 20A, and in like manners amplifiers 42B, 42C, 42D, 42E and 42F are connected across resistors 20B, 20C, 20D, 20E and 20F, respectively. The output of amplifier 42A is connected to a sampler 44A, and in like manners the outputs of amplifiers 42B, 42C, 42D, 42E, and 42F are connected to samplers 44B, 44C, 44D, 44E, and 44F, respectively. Each of the samplers is provided with an output terminal 46A, 46B, 46C, 46D, and 46F, respectively, and is also connected to a program generator 48.

The samplers produce a pulse on their respective output terminal for each pulse from the program generator which occurs during periods of output from the amplifier connected thereto. If the program generator pulses each of the samplers sequentially, the output terminals 46A, 46B, 46C, 46D, 46E and 46F may be interconnected to form a single output terminal which delivers a sequential output. If the program generator delivers each pulse to all samplers, the output terminals will carry parallel output as illustrated. Since samplers and program generators suitable for carrying out these functions are disclosed in the inventor's application entitled "Optical Encoder," Serial No. 655,653, filed April 29, 1957, they will not be described in detail.

Figure 3:
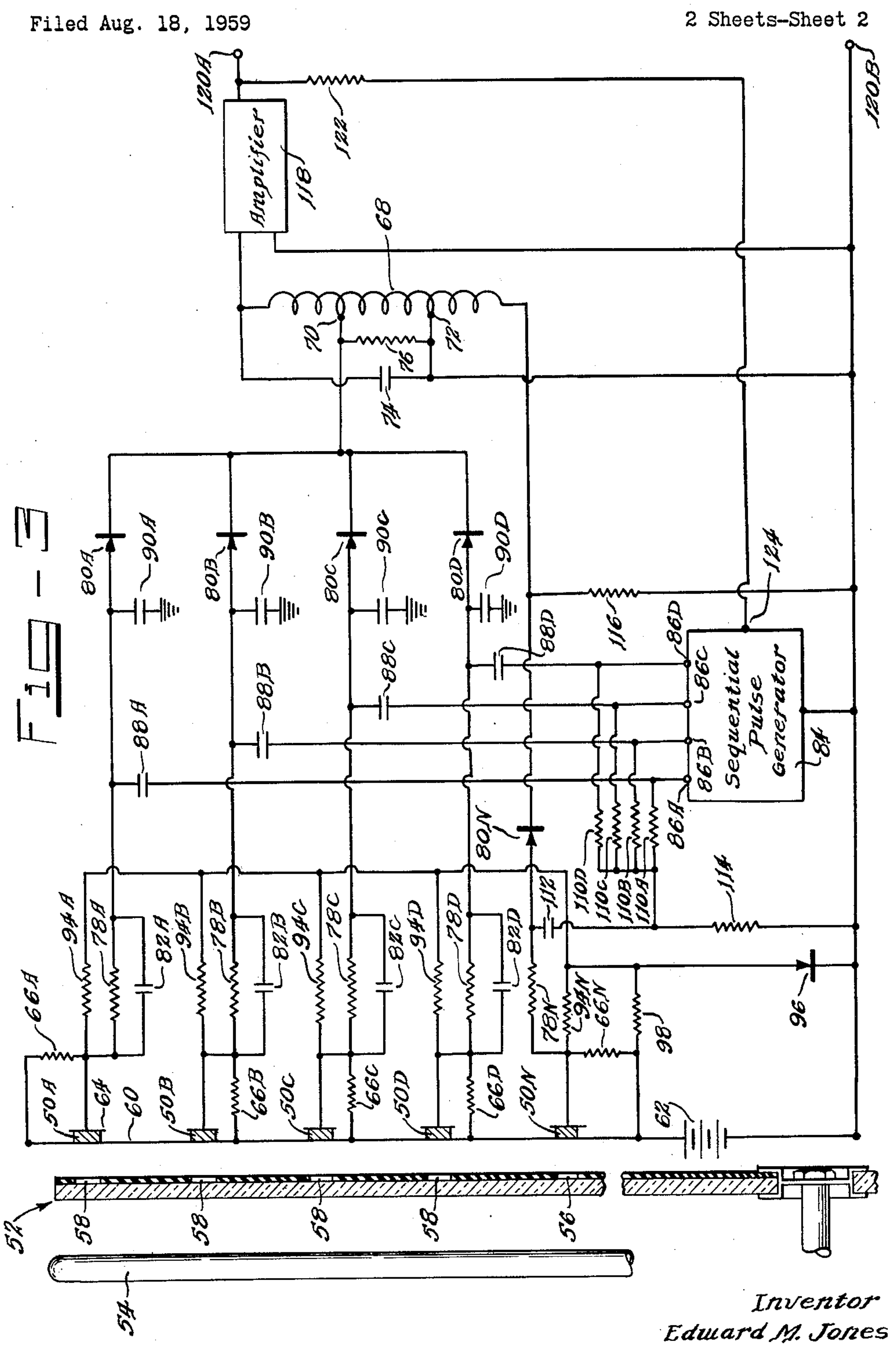
FIGURE 3 is a schematic electrical circuit diagram of an optical encoder employing a modification of the photocell circuit illustrated in FIGURE 1 and constitutes another embodiment of the present invention.

FIGURE 3 illustrates an optical encoder which employs time constant compensation means for the photocells and constitutes another embodiment of the present invention. In FIGURE 3, a plurality of photocells 50A, 50B, 50C, 50D and 50N, identical in construction, confront one side of a code disc 52, and a constant intensity light source 54 confronts the other side of the code disc 52. The photocells and light source may be identical to those illustrated in FIGURE 2, but the code disc 52 employs a coaxial track 56 confronting the photocell 50N in addition to the coaxial tracks of opaque and transparent sectors designated 58 which are similar to the tracks of the code disc of FIGURE 2. The track 56 is entirely transparent, but arranged to transmit approximately one half the light transmitted by a transparent sector of any of the other tracks 58 of the code disc 52. This may be accomplished most readily by either restricting the width of the track 56 or its transparency.

A common electrode 60 of each of the photocells is connected to one of the terminals of a direct current power source, illustrated as battery 62. The other electrode 64 of each of the photocells is connected to the electrode 60 through a shunting resistor 66A, 66B, 66C, 66D and 66N, respectively.

The encoder is provided with a coil or a transformer 68 which has two taps 70 and 72. A capacitor 74 is connected to one end of the transformer and the tap 72 to form a parallel tuned resonant circuit. A loading resistor 76 interconnects the taps 70 and 72 to reduce the Q of the transformer 68.

The electrode 64 of each of the photocells 50A, 50B, 50C, and 50D is connected to the tap 70 of the transformer 68 by a resistor 78A, 78B, 78C, or 78D connected in series with a diode 80A, 80B, 80C, or 80D connected to pass positive charges to the transformer 60. The tap 72 of the transformer 68 is connected to the negative terminal of the battery 62, which is also ground potential, thereby forming a series circuit for each photocell including the battery 62, the transformer 68, the respective photocell and its associated diode and resistor. Also, a capacitor 82A is connected in parallel with resistor 78A, and in like manner capacitors 82B, 82C, and 82D are connected in parallel with resistors 78B, 78C, and 78D, respectively. It is to be noted that photocell 50A, resistor 78A, capacitor 82A, and diode 80A form a circuit similar to that illustrated in FIGURE 1 with the diode replacing resistor 20 of FIGURE 1 and the return to the battery including a portion of the transformer 68. Also, each of the photocells 50B, 50C, and 50D is connected in a similar circuit.

A sequential pulse generator 84 is provided with output terminals 86A, 86B, 86C, and 86D. The sequential pulse generator 84 generates a series of pulses equally spaced in time for each cycle, and a different one of these pulses is impressed on each output terminal in each cycle. The output 86A is coupled to the circuit of photocell 50A through a capacitor 88A connected to the junction between resistor 78A and diode 80A, and output terminals 86B, 86C, and 86D are connected to the junction between corresponding resistors and diodes of the other photocell circuits through capacitors 88B, 88C, and 88D, respectively. The sequential pulse generator 84 thus applies pulses in sequence across diodes 80A, 80B, 80C, and 80D. Also, capacitors 90A, 90B, 90C, and 90D are connected between ground and the junctions between the diodes 80A, 80B, 80C, and 80D and the capacitors 88A, 88B, 88C, and 88D, respectively.

A resistor 94A is connected between photocell 50A and a bias circuit consisting of diode 96 and resistor 98. This circuit maintains a constant current through the diode 80A when the photocell is dark, despite changes in temperature. Similarly, resistors 94B, 94C, 94D and 94N maintain constant currents through diodes 80B, 80C, 80D and 80N desipte temperature changes.

The photocell 50N is for the purpose of generating a signal to be employed to compensate for fluctuations in the intensity of the light source 54 in a manner analogous to that disclosed in the inventor's application entitled "Optical Encoder," Serial No. 727,649, filed April 10, 1958. This electrode 64 of photocell 50N is also connected to the end of the transformer 68 adjacent to the tap 72 through the resistor 78N and diode 80N connected in series. The output terminals 86A, 86B, 86C, and 86D of the sequential pulse generator 84 are coupled to the photocell 50N through resistors 110A, 110B, 110C, and 110D, respectively, connected in series with a capacitor 112 to the junction of the resistor 78N and diode 80N. A resistor 114 is connected between the junction of capacitor 112 and the resistors 110A, 110B, 110C and 110D and ground.

The input of an amplifier 118 is connected between the end of the transformer 68 connected to the capacitor 74 and ground, and the output of the encoder is taken from the output of the amplifier 118 by means of terminals designated 120A and 120B. The output appearing across the terminals 120A and 120B is preferably mixed with a sampling pulse to cause each illuminated photocell to produce an output signal in excess of a threshold value, and for this purpose a resistor 122 is connected between the output terminal 120A and an output terminal on the sequential pulse generator 84 designated 124. The sequential pulse generator 84 supplies this terminal 124 with a short pulse of constant amplitude for each pulse applied to any of the other output terminals 86A, 86B, 86C, and 86D.

The encoder illustrated in FIGURE 3 operates with a constant intensity light source, as in the encoder illustrated in FIGURE 2. Each of the photocells 50A, 50B, 50C, and 50D is connected in a photocell circuit, as set forth above, the circuit for photocell 50A, for example, including the resistor 78A, the diode 80A, the portion of the coil 68, the taps 70 and 72, and the direct current source or battery 62. The diode 80A in the range of operation constitutes a resistance element with a resistance which is a decreasing function of applied voltage, the particular function being approximately exponential. The diode is essentially nonconducting for potentials applied in the forward direction below a threshold value, and as the potential is raised above the threshold value and the diode begins conducting, the effective resistance of the diode decreases exponentially as the potential is increased. For potentials greater than a second and higher threshold, the forward to back resistance of the diode approaches a constant value, but operating potentials in the present device are below this region.

As explained in reference to FIGURE 1, the time constant compensation circuit 16 improves the wave form of the electrical signal in response to a dark to light or light to dark transition of the photocell at the expense of reduced potential appearing across resistor 20 or reduced current flowing through resistor 20.

In FIGURE 3, the diode 80A corresponds to resistor 20 of FIGURE 1 for the photocell circuit of photocell 50A, and the relatively small current flowing through the diode 80A establishes the resistance of the diode at one of two levels depending upon whether or not the photocell 50A is in the dark or illuminated. The resistor 66A which shunts the photocell 50A is selected to provide the desired dark current through the diode 60A in order to operate the diode in its range of potentials producing an inverse exponential resistance relationship to the potential.

The diode 80A passes all pulses from the terminal 86A of the sequential pulse generator 84, but the magnitude of the pulse flowing through the diode 80A is determined by the magnitude of the photocell current flowing through the photocell circuit, and hence whether or not the photocell 50A is illuminated or dark. When the photocell current is large, that is the photocell 50A is illuminated, the magnitude of the pulse from the terminal 86A of the sequential pulse generator which flows through the diode 80A is substantially greater than the magnitude of this pulse with dark photocell circuit current. As a result, an electrical pulse which may be amplified with alternating current techniques is provided from the photocell 50A. In like manner, each of the photocells 50B, 50C, and 50D provides pulses in response to the output of the sequential pulse generator 84. Since the sequential pulse generator, which may be a ring oscillator, produces a series of pulses equally spaced in time which are individually applied to each of the photocell circuits, the currents flowing through the diodes 80A, 80B, 80C, and 80D constitute a series of time spaced pulses.

In one particular construction of the embodiment of the invention illustrated in FIGURE 3, the photocells are constructed of cadmium selenide in the manner of the aforementioned patent application of Hugle and Hugle. The resistors 78A, 12B, 12C, and 78D have values of 1 megohm. The diodes 80A, 80B, 80C, and 80D are silicon diodes which have reverse currents at small reverse voltages no greater than 0.1 microampere at the highest operating temperature, and the resistors 66A, 66B, 66C, and 66D are selected to produce dark photocell circuit currents through the diodes of approximately 0.3 microampere. Under these conditions, the diode resistance is approximately 83,000 ohms. The illuminated photocell current in the photocell circuits is approximately 0.8 microampere which reduces the diode resistance to approximately 32,000 ohms. The sequential pulse generator 84 provides pulses of approximately 40 millivolts in the forward direction across the diodes. The capacitors 88A, 88B, 88C, and 88D and the capacitors 90A, 90B, 90C and 90D form voltage dividers for the pulses from the sequential pulse generator 84, and are 3 micromicrofarads and 330 micromicrofarads, respectively.

The auto-transformer 68 and capacitor 74 form a resonant circuit for the pulses from the sequential pulse generator 84. In the particular construction described, the sequential pulse generator 84 produces 1 microsecond pulses, and the coil 68 and capacitor 74 forms a parallel tuned resonant circuit at 500 kilocycles of relatively low Q.

It is to be noted that the signals produced by the photocells are sampled prior to amplification so that the poor stability of the amplifier does not appreciably affect the ultimate output of the encoder. The amplifier 118 also receives stepped-up pulses from the transformer 68 because of the turns ratio of the primary and secondary, which in the particular construction is approximately 3 to 1.

FIGURE 4 illustrates the output potential appearing across the terminals 120A and 120B relative to time. A sampling pulse from the sequential pulse generator 84 is also applied to the output of the amplifier 118, and is coincident with every pulse which appears on any one of the terminals 86A, 86B, 86C, or 86D. This makes it readily possible to provide an electronic stage subsequent to the illustrated encoder responsive to signal above a threshold value and adjust the threshold of the stage connected to the terminals 120A and 120B to correspond to the level of the sampling pulse from the terminal 124 of the sequential pulse generator 84. Under these conditions, only those pulses in the sequence of the interrogation of the photocell circuits which exceed the threshold will indicate illuminated photocells, and all other photocells will be indicated as dark.

The photocell 50N is for the purpose of compensating for variations in light intensity, as described above. The photocell 50N is also connected in a photocell circuit which includes resistor 78N, diode 80N, and the battery 62. Since the magnitude of the light falling on the photocell 50N is constant in intensity and approximately equal to one-half of the intensity of the other photocells when illuminated, the current in the photocell circuit in the absence of a pulse from the sequential pulse generator 84 is constant and establishes the resistance of the diode 80N at a value approximately mid-way between the two resistance levels of the other diodes 80A, 80B, 80C or 80D corresponding to photocells in the dark and in the light. The resistor 66N is selected to produce this desired photocell circuit current. Since the sequential pulse generator 84 applies a pulse across the diode 80N for each pulse impressed on the diodes of the circuits of photocells 50A, 50B, 50C, and 50D, the circuit of reference photocell 50N impresses a pulse on the transformer 68 which is of opposite polarity to the pulses impressed from the other photocell circuits, and of an amplitude approximately mid-way between the illuminated and dark magnitudes of the pulses from the other photocell circuits. Unless the pulses from the other photocell circuits exceed the pulse from the reference photocell circuit, the pulse impressed upon the input of the amplifier 118 will result in an amplifier output less than the threshold value. The preferable mode of operation is to have the pulse from the reference photocell circuit equal to approximately one-half of the pulse from one of the other photocells when illuminated, so that the input to the amplifier 118 will be negative for photocell circuits in which the photocell is not illuminated, and positive by an approximately equal amount for photocell circuits which are illuminated. In the particular construction described, the reference photocell circuit was adjusted in this manner, and the input of the amplifier for illuminated photocell circuits is 1.6 millivolts, and for non-illuminated photocell circuits —1.6 millivolts.

The resistors 94A, 94B, 94C, and 94D are adjusted to provide the desired voltage increment thereacross due to the light applied through the code disc on the respective photocells, and in the particular construction described, this value is 0.5 volt, and the resistors vary between approximately 25,000 and 75,000 ohms depending upon variations in individual photocells. The resistors 94A, 94B, 94C, and 94D are returned to the junction between the resistor 98 and diode 96 in order to provide stabilization against temperature variations. The resistor 98 provides the diode 96 with a substantially constant current.

From the foregoing disclosure, those skilled in the art will readily devise many modifications of the optical devices and encoders herein disclosed, and many applications for the inventions herein set forth in addition to those disclosed. It is therefore intended that the scope of the invention be not limited by the foregoing disclosure, but rather only by the appended claims.

The invention claimed is:

1. An optical device comprising a light source, a photocell confronting the light source, a light shutter disposed between the light source and the photocell, a series photocell circuit including the photocell and a resistance element, and a load electrically coupled to the resistance element characterized by the construction wherein the resistance element comprises a diode, and the photocell circuit includes a direct current source polarized to pass charges through the diode in the forward direction to establish a minimum forward diode current, and a pulse source connected in parallel with the diode and polarized to apply pulses in the forward direction to the diode, whereby the magnitude of the pulses flowing through the diode is proportional to the photocell response.

2. An optical device comprising a light source, a photocell confronting the light source, means to vary the magnitude of the illumination falling on the photocell, a series circuit including the photocell, a direct current source, and a resistance element having a resistance which is a decreasing function of applied voltage, and a pulse source connected in parallel with the resistance element, whereby the magnitude of the pulse current flowing through the resistance element is determined by the magnitude of the illumination of the photocell.

3. An optical device comprising the elements of claim 2 wherein the photocell comprises two spaced electrodes and a mass of semiconductive material disposed therebetween.

4. An optical device comprising the elements of claim 2 wherein the photocell comprises two electrodes and a mass of photovoltaic material disposed therebetween.

5. An optical encoder comprising the elements of claim 2 wherein the means to vary the magnitude of the illumination falling on the photocells comprises a code member movably mounted between the light source and the photocell having a track of alternate opaque and transparent sectors parallel with the direction of motion of the member and aligned with the light source and photocell.

6. An optical encoder comprising the elements of claim 5 wherein the resistance element is a diode.

7. An optical encoder comprising a code disc having a plurality of coaxial tracks of alternate opaque and transparent sectors, a light source disposed on one side of the code disc confronting the tracks thereof, a plurality of photocells mounted on the side of the code disc opposite the light source, one of said photocells confronting each track of the code disc, a series circuit for each of said photocells including a diode and a direct current source, a pulse generator, means electrically connected to the pulse generator and each of the diodes for coupling the pulse generator across each of the diodes, and means for determining for each diode the existance of an electrical current of a magnitude greater than a threshold value flowing through said diodes.

8. An optical encoder comprising the elements of claim 7 wherein the photocells comprise two electrodes and a mass of photoconductive material disposed therebetween.

9. An optical encoder comprising the elements of claim 7 wherein the pulse generator generates a plurality of pulses for each cycle thereof, each of the pulses in each cycle appearing between a common terminal and a separate output terminal of the pulse generator and occurring at a unique time interval from the beginning of the cycle, and the means for coupling the pulse generator across each of the diodes electrically connecting each of the output terminals of the pulse generator to different diodes.

10. An optical encoder comprising the elements of claim 9 in combination with an alternating current amplifier having an input circuit coupled to each of the diodes.

11. An optical encoder comprising the elements of claim 10 in combination with a transformer having an input winding connected in series with all of the photocell circuits and an output winding connected to the amplifier, and a capacitor connected in parallel with the output winding, the output winding and capacitor being resonant with the pulses from the pulse generator.

12. An optical encoder comprising the elements of claim 1 in combination with a resistor connected in parallel with the photocell, whereby the resistor and direct current source determine the magnitude of the current flowing through the diode in the absence of illumination of the photocell.

13. An optical encoder comprising the elements of claim 9 wherein the means for coupling each of the output terminals of the pulse generator to different diodes comprises a first capacitor and a second capacitor connected in series between each of the output terminals of the pulse generator and the common output terminal thereof, the junction between the first and second capacitors being electrically connected to one of the diodes.

14. An optical encoder comprising a light source, a plurality of photocells confronting the light source, each of said photocells being electrically connected in a series circuit including a direct current power source and a resistance element having a resistance which is a decreasing function of applied voltage, a code member mounted for motion along a path between the light source and photocells having a track parallel to the path confronting each photocell, one of said tracks being transparent and the other tracks having alternating transparent and opaque sectors, a pulse generator connected in parallel with each of the resistance elements, and means for subtracting the current flowing through the resistance element of the circuit of the photocell confronting the transparent track from the current flowing through the resistance element of each of the other circuits.

15. An optical encoder comprising a light source, a plurality of photocells confronting the light source, each of said photocells being electrically connected in a series circuit including a direct current power source and a diode having a resistance which is a decreasing function of applied voltage, a code member mounted for motion along a path between the light source and photocells having a track parallel to the path confronting each photocell, one of said tracks being transparent and the other tracks having alternating transparent and opaque sectors, a sequential pulse generator having separate output terminals connected in parallel with each of the diodes and producing a plurality of pulses in each cycle, the photocell confronting the transparent track receiving all of the pulses in each cycle and each of the other photocells receiving a single and different pulse each cycle, and a coil connected in series with each of the photocell circuits, the circuit of the photocell confronting the transparent track being connected in opposition to the other photocell circuits.

16. An optical encoder comprising the elements of claim 15 wherein each of the photocells comprises two electrodes and a mass of photoconductive material disposed therebetween.

17. An optical encoder comprising the elements of claim 15 wherein the coil is the primary winding of a transformer having a secondary winding and the secondary winding resonates at a frequency suitable for the pulses from the sequential pulse generator.

18. An optical encoder comprising the elements of claim 17 in combination with an alternating current amplifier connected to the secondary winding of the transformer.

19. An optical encoder comprising the elements of claim 18 in combination with a sampling pulse generator synchronized with the sequential pulse generator coupled to the output of the amplifier.

20. An optical device having a light source, a photocell confronting the light source, a light shutter disposed between the light source and the photocell, a first resistance element connected in series with the photocell, and a load electrically connected to the resistance element characterized by the improved construction wherein a time constant compensation circuit is electrically connected between the load and the first resistance element comprising second and third serially connected resistance elements connected in parallel with the first resistance element and a capacitor connected in parallel with the second resistance element, the load being electrically coupled to the third of said resistance elements.

21. An optical encoder comprising the elements of claim 20 wherein the photocell comprises two electrodes and a mass of semiconductive material disposed therebetween.

22. An optical device comprising the elements of claim 20 wherein the photocell comprises two electrodes and a mass of photovoltaic material disposed therebetween.

23. An optical encoder comprising a code member adapted to move responsive to the signal to be encoded having a plurality of tracks of transparent and opaque sectors disposed generally parallel to the direction of motion of the code members, a light source mounted on one side of the code member and a plurality of photocells mounted on the other side of the code member, one of said photocells confronting each track of the code member, a first resistor connected in series with each photocell, a time constant compensation circuit connected across each resistor including second and third serially connected resistors connected in parallel with the first resistor and a capacitor connected in parallel with the second resistor, and means for determining which of the third resistors have signals impressed thereon at a given time.

24. An optical encoder comprising a code disc having a plurality of alternate opaque and transparent sectors, a light source disposed on one side of the code disc confronting the tracks thereof and a plurality of photocells mounted on the other side of the code disc, one of said photocells confronting each track of the code disc, a first resistor connected in series with each photocell, a time constant compensation circuit connected across each resistor including second and third serially connected resistors connected in parallel with the first resistor and a capacitor connected in parallel with the second resistor, and means for determining which of the third resistors have signals impressed thereon at a given time.

References Cited in the file of this patent

UNITED STATES PATENTS

| | | |
|---|---|---|
| 2,714,204 | Lippel et al. | July 26, 1955 |
| 2,747,797 | Beaumont | May 29, 1956 |
| 2,775,727 | Kernahan et al. | Dec. 25, 1956 |
| 2,793,807 | Yaeger | May 28, 1957 |
| 2,840,719 | Peterson | June 24, 1958 |
| 2,921,204 | Hastings et al. | Jan. 12, 1960 |